US008392384B1

(12) United States Patent
Wu et al.

(10) Patent No.: US 8,392,384 B1
(45) Date of Patent: Mar. 5, 2013

(54) METHOD AND SYSTEM OF DEDUPLICATION-BASED FINGERPRINT INDEX CACHING

(75) Inventors: Weibao Wu, Vadnais Heights, MN (US); Viswesvaran Janakiraman, San Jose, CA (US)

(73) Assignee: Symantec Corporation, Mountain View, CA (US)

( * ) Notice: Subject to any disclaimer, the term of this patent is extended or adjusted under 35 U.S.C. 154(b) by 117 days.

(21) Appl. No.: 12/965,161

(22) Filed: Dec. 10, 2010

(51) Int. Cl.
G06F 7/00 (2006.01)
G06F 17/30 (2006.01)

(52) U.S. Cl. ........................................ 707/693; 711/134
(58) Field of Classification Search .................. None
See application file for complete search history.

(56) References Cited

U.S. PATENT DOCUMENTS

| | | | |
|---|---|---|---|
| 5,561,421 A | 10/1996 | Smith | |
| 5,990,810 A | 11/1999 | Williams | |
| 6,014,676 A | 1/2000 | McClain | |
| 6,141,784 A | 10/2000 | Davis | |
| 6,389,433 B1 | 5/2002 | Bolosky et al. | |
| 6,513,051 B1 | 1/2003 | Bolosky et al. | |
| 6,785,786 B1 | 8/2004 | Gold et al. | |
| 6,865,655 B1 | 3/2005 | Andersen | |
| 6,920,537 B2 | 7/2005 | Ofek et al. | |
| 6,983,365 B1 | 1/2006 | Douceur et al. | |
| 7,055,008 B2 | 5/2006 | Niles | |
| 7,136,976 B2 | 11/2006 | Saika | |
| 7,146,429 B2 | 12/2006 | Michel | |
| 7,200,604 B2 | 4/2007 | Forman et al. | |
| 7,213,158 B2 | 5/2007 | Bantz et al. | |
| 7,257,104 B2 | 8/2007 | Shitama | |
| 7,257,643 B2 | 8/2007 | Mathew | |
| 7,310,644 B2 | 12/2007 | Adya et al. | |
| 7,318,072 B2 | 1/2008 | Margolus | |
| 7,359,920 B1 | 4/2008 | Rybicki et al. | |
| 7,389,394 B1 | 6/2008 | Karr | |
| 7,401,194 B2 | 7/2008 | Jewell | |
| 7,409,523 B2 | 8/2008 | Pudipeddi | |
| 7,424,514 B2 | 9/2008 | Noble et al. | |
| 7,454,592 B1 | 11/2008 | Shah | |
| 7,478,113 B1 | 1/2009 | De Spiegeleer et al. | |
| 7,978,513 B2 * | 7/2011 | Kasuga ..................... | 365/185.03 |

(Continued)

OTHER PUBLICATIONS

Sparse Indexing: Large Scale, Inline Deduplication USing Sampling and Locality, Lillibridge et al, 7th USENIX Conference on File and Storage Technologies, Jun. 6, 2009.*

(Continued)

*Primary Examiner* — Augustine K Obisesan
(74) *Attorney, Agent, or Firm* — Rory D. Rankin; Meyertons, Hood, Kivlin, Kowert & Goetzel, P.C.

(57) ABSTRACT

A system, method, and medium for dynamically scaling the size of a fingerprint index in a deduplication storage system. Fingerprints are stored as entries in a fingerprint index, and the fingerprint index is scaled to fit into an in-memory cache to enable fast accesses to the index. A persistent copy of the full fingerprint index is stored on a non-volatile memory. The cached fingerprint index uses binary sampling to categorize half of the fingerprint entries as samples and protected, and the other half of the entries as non-samples and replaceable. When a search of the cached index results in a hit on a sample entry, all of the non-sample entries associated with the same container are copied from the persistent index to the cached index.

20 Claims, 8 Drawing Sheets

U.S. PATENT DOCUMENTS

| | | | |
|---|---|---|---|
| 2001/0045962 A1 | 11/2001 | Lee et al. | |
| 2002/0107877 A1 | 8/2002 | Whiting et al. | |
| 2003/0135385 A1* | 7/2003 | Karpoff | 705/1 |
| 2004/0044707 A1 | 3/2004 | Richard | |
| 2004/0143731 A1 | 7/2004 | Audebert et al. | |
| 2005/0027766 A1 | 2/2005 | Ben | |
| 2005/0033720 A1* | 2/2005 | Verma et al. | 707/1 |
| 2005/0198328 A1 | 9/2005 | Lee et al. | |
| 2005/0204108 A1 | 9/2005 | Ofek | |
| 2005/0216813 A1 | 9/2005 | Cutts et al. | |
| 2006/0026219 A1 | 2/2006 | Orenstein et al. | |
| 2006/0050789 A1* | 3/2006 | Gisquet et al. | 375/240.23 |
| 2006/0114131 A1* | 6/2006 | Kolavi | 341/50 |
| 2006/0224578 A1* | 10/2006 | Kadatch et al. | 707/5 |
| 2006/0271540 A1 | 11/2006 | Williams | |
| 2007/0192548 A1 | 8/2007 | Williams | |
| 2007/0198659 A1 | 8/2007 | Lam | |
| 2007/0250674 A1 | 10/2007 | Fineberg et al. | |
| 2008/0005141 A1* | 1/2008 | Zheng et al. | 707/101 |
| 2008/0034162 A1* | 2/2008 | Sturges et al. | 711/129 |
| 2008/0133561 A1 | 6/2008 | Dubnicki et al. | |
| 2008/0154989 A1 | 6/2008 | Arman | |
| 2008/0228939 A1 | 9/2008 | Samuels et al. | |
| 2008/0243769 A1 | 10/2008 | Arbour et al. | |
| 2008/0243953 A1 | 10/2008 | Wu et al. | |
| 2008/0244204 A1 | 10/2008 | Cremelie et al. | |
| 2009/0113167 A1* | 4/2009 | Camble et al. | 711/216 |
| 2009/0204636 A1* | 8/2009 | Li et al. | 707/103 Y |
| 2010/0042790 A1* | 2/2010 | Mondal et al. | 711/161 |
| 2010/0058013 A1* | 3/2010 | Gelson et al. | 711/162 |
| 2010/0083003 A1 | 4/2010 | Spackman | |
| 2010/0250896 A1 | 9/2010 | Matze | |
| 2010/0257403 A1 | 10/2010 | Virk et al. | |
| 2010/0274982 A1 | 10/2010 | Mehr et al. | |
| 2010/0313036 A1* | 12/2010 | Lumb | 713/189 |
| 2010/0332452 A1 | 12/2010 | Hsu et al. | |
| 2011/0010502 A1* | 1/2011 | Wang et al. | 711/128 |
| 2011/0022773 A1* | 1/2011 | Rajamony et al. | 711/3 |
| 2011/0246741 A1* | 10/2011 | Raymond et al. | 711/170 |
| 2012/0030477 A1* | 2/2012 | Lu et al. | 713/189 |

OTHER PUBLICATIONS

A generalized target-driven cache replacement policy for mobile environments, Yin et al. Journal of Parallel Distribut. Comput., 65, pp. 583-594, 2005.*

Efficient index lookup for De-duplication backup system, Won et al Procceedings of IEEE Internation Symposium Modeling, Analysis and Simulation of Computers and Telecomm. (MASCOTS '08), pp. 1-3,, Sep. 2008.*

3DNBS: A Data De-duplication Disk-based Network Backup System, Yang et al., 2009 IEEE International COnference on Networking, Architecture and Storage, pp. 287-294, 2009.*

U.S. Appl. No. 11/404,105 entitled Routing, filed Apr. 13, 2006.

U.S. Appl. No. 11/403,379 entitled Parallel Backup, filed Apr. 13, 2006.

U.S. Appl. No. 11/641,389, filed Dec. 18, 2006 entitled "Single Instance Storage".

* cited by examiner

| Cached Fingerprint Index 310 |||
| --- | --- | --- |
| Fingerprint Identification (ID) | Four Least Significant Bits (LSB's) of Fingerprint | Container ID |
| 1 | 0010 | 1 |
| 2 | 0111 | 1 |
| 3 | 1000 | 2 |
| 4 | 1111 | 2 |
| 5 | 1011 | 2 |
| 6 | 0011 | 3 |
| 7 | 1010 | 3 |
| 8 | 1100 | 3 |

| New Fingerprint 320 |||
| --- | --- | --- |
| 9 | 0110 | 3 |

*FIG. 3*

| Cached Fingerprint Index 410 ||||
|---|---|---|---|
| Fingerprint Identification (ID) | Four LSB's of Fingerprint | Container ID | Sample or Non-Sample |
| 1 | 0010 | 1 | Sample |
| 2 | 0111 | 1 | Non-Sample |
| 3 | 1000 | 2 | Sample |
| 9 | 0110 | 3 | Sample |
| 5 | 1011 | 2 | Non-Sample |
| 6 | 0011 | 3 | Non-Sample |
| 7 | 1010 | 3 | Sample |
| 8 | 1100 | 3 | Sample |

New Fingerprint 320 →

Discarded Fingerprint →

| 4 | 1111 | 2 | Non-Sample |
|---|---|---|---|

| Persistent Fingerprint Index 420 ||||
|---|---|---|---|
| Fingerprint Identification (ID) | Four LSB's of Fingerprint | Container ID | Sample or Non-Sample |
| 1 | 0010 | 1 | Sample |
| 2 | 0111 | 1 | Non-Sample |
| 3 | 1000 | 2 | Sample |
| 4 | 1111 | 2 | Non-Sample |
| 5 | 1011 | 2 | Non-Sample |
| 6 | 0011 | 3 | Non-Sample |
| 7 | 1010 | 3 | Sample |
| 8 | 1100 | 3 | Sample |
| 9 | 0110 | 3 | Sample |

FIG. 4

Search the Cached Index and Find a Match →

| Cached Fingerprint Index 510 ||||
| Fingerprint Identification (ID) | Four LSB's of Fingerprint | Container ID | Sample or Non-Sample |
| --- | --- | --- | --- |
| 1 | 0010 | 1 | Sample |
| 2 | 0111 | 1 | Non-Sample |
| 3 | 1000 | 2 | Sample |
| 9 | 0110 | 3 | Sample |
| 5 | 1011 | 2 | Non-Sample |
| 6 | 0011 | 3 | Non-Sample |
| 7 | 1010 | 3 | Sample |
| 8 | 1100 | 3 | Sample |

Retrieve a Non-Sample from the Container Index Corresponding to the Same Container as the Match →

| Cached Fingerprint Index 520 ||||
| Fingerprint Identification (ID) | Four LSB's of Fingerprint | Container ID | Sample or Non-Sample |
| --- | --- | --- | --- |
| 1 | 0010 | 1 | Sample |
| 4 | 1111 | 2 | Non-Sample |
| 3 | 1000 | 2 | Sample |
| 9 | 0110 | 3 | Sample |
| 5 | 1011 | 2 | Non-Sample |
| 6 | 0011 | 3 | Non-Sample |
| 7 | 1010 | 3 | Sample |
| 8 | 1100 | 3 | Sample |

Discard this Non-Sample Entry Associated with a Different Container ID →

| 2 | 0111 | 1 | Non-Sample |
| --- | --- | --- | --- |

| Cached Fingerprint Index 710 ||||| 
|---|---|---|---|---|
| Fingerprint Identification (ID) | Four LSB's of Fingerprint | Container ID | Sample or Non-Sample | Non-Committed Flag |
| 1 | 0010 | 1 | Sample | 0 |
| 12 | 1100 | 4 | Sample | 1 |
| 3 | 1000 | 2 | Sample | 0 |
| 9 | 0110 | 3 | Sample | 0 |
| 11 | 0010 | 4 | Sample | 1 |
| 10 | 0000 | 4 | Sample | 1 |
| 7 | 1010 | 3 | Sample | 0 |
| 8 | 1100 | 3 | Sample | 0 |

New Fingerprints → (rows 12, 11, 10)

METHOD AND SYSTEM OF DEDUPLICATION-BASED FINGERPRINT INDEX CACHING

BACKGROUND OF THE INVENTION

1. Field of the Invention

The present invention relates generally to maintaining fingerprint indexes, and in particular to a method and system for scaling the size of a deduplication-based fingerprint index to fit in a memory cache to enable efficient index lookups.

2. Description of the Related Art

Block-level deduplication storage systems often face a fingerprint index scaling problem as the number of data segments and fingerprints stored in the system increases. Deduplication storage systems maintain a fingerprint index to implement the deduplication process. The deduplication storage system receives data segments, or receives data and partitions it into segments, and then the system generates fingerprints for the data segments. The system will search the fingerprint index for a match with the newly generated fingerprint, and if it finds a match, it will discard the new fingerprint and store a reference to the identical data segment (corresponding to the matching fingerprint) already in the deduplication storage system.

Deduplication storage systems often perform hundreds of thousands of lookup and insert operations every second on a fingerprint index. Ideally the fingerprint index will be stored in a fast memory device so that these lookup and insert operations may execute quickly. However, typical fast memory devices, such as volatile random access memory (RAM) devices, are limited on the amount of data they can store. Slower memory devices, such as non-volatile disk storage devices, can store more data but have slower access times. If the fingerprint index is stored in a slow storage device, the lookup and insert operations may create a bottleneck for backup and restore operations and degrade system performance. As a result, the backup window for a client may increase, resulting in the backup taking a much longer period of time. It may also increase the duration of a restore operation, such that a client may have to wait for an unacceptably long period of time to receive a requested data item after making the restoration request.

The performance degradation is not an issue when the fingerprint index can fit into a fast storage device, such as an in-memory cache. However, as the number of fingerprints grows, the fingerprint index may exceed the available storage space in the in-memory cache. One possible solution is to increase the size of the cache, such as by adding another media server or content router to the deduplication storage system. However, this is an expensive solution to the problem, and each time the size of the fingerprint index exceeds the in-memory cache, another media server or content router may need to be added to the deduplication storage system.

Another possible solution is to scale the size of the fingerprint index to fit in the cache. However, current scaling solutions are not able to dynamically adjust to changes in the size of the index. Other current scaling solutions sacrifice deduplication efficiency by keeping only a small portion of the fingerprint index in cache memory. Therefore, what is needed in the art is a way to dynamically adjust the size of the fingerprint index to fit in the cache and to maximize deduplication efficiency by keeping fingerprints likely to be accessed in the cache.

In view of the above, improved methods and mechanisms for efficiently managing fingerprint indexes within a deduplication storage system are desired.

SUMMARY OF THE INVENTION

Various embodiments of methods and mechanisms for optimizing efficiency in a deduplication storage system are contemplated. In one embodiment, a fingerprint may be generated for a new data segment, and then a first fingerprint index stored in a first storage device may be searched to determine if there is a matching fingerprint already in the first fingerprint index. The first fingerprint index may be used for fingerprint searches when a new fingerprint is generated to determine if the new fingerprint is unique or redundant. The first storage device may be a cache or other low latency storage device, allowing for efficient searches of the first fingerprint index. If a matching fingerprint is not found, the new entry may be added to the first fingerprint index. The new data segment may be stored in a container in a storage device, and the identification (ID) of the container may be stored in the new entry.

The new entry may be a non-committed entry in the first fingerprint index. The new entry may be copied later in a batch write operation including multiple non-committed entries to a second fingerprint index in a second storage device. The second storage device may be a non-volatile storage device with a larger storage capacity and higher latency than the first storage device. After the new entry has been copied to the second fingerprint index, the new entry in the first fingerprint index may be marked to indicate it has been committed.

As more entries are added to the first fingerprint index, the first fingerprint index will increase in size. If the first fingerprint index exceeds a predetermined size, or if the first fingerprint index exceeds the available storage capacity of the first storage device, then the deduplication storage system may enter binary sampling mode for the first fingerprint index. If the deduplication storage system is already using binary sampling, then the system may move to a higher level of binary sampling.

Entering binary sampling mode may consist of marking a first subset of the plurality of entries in the first fingerprint index as sample entries and marking a second subset of entries as non-sample entries. The sample entries may be retained in the first fingerprint index while the non-sample entries may be discarded to make room for new fingerprint entries. In one embodiment, entries containing a fingerprint with a least significant bit (LSB) of 0 may be sample entries, and entries containing a fingerprint with a LSB of 1 may be non-sample entries.

While in binary sampling mode, non-sample entries may be prefetched from the container where the data is stored if a fingerprint search of the first fingerprint index results in a match and if the matching entry is a sample entry. In such an embodiment, containers may have an associated index file which stores corresponding fingerprints. In other embodiments, the fingerprints may be stored elsewhere. The container ID of the matching entry may be read, and then each non-sample entry in the second fingerprint index with the same container ID may be copied to the first fingerprint index. Non-samples entries in the first fingerprint index containing a different container ID than the container ID of the matching entry may be discarded to make room for the prefetched entries in the first fingerprint index. In other embodiments, a list may be maintained which indicates a relative level of activity for containers. In such an embodiment, containers being accessed less frequently may have their entries discarded before more active containers.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which.

DETAILED DESCRIPTION

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Figure 1:
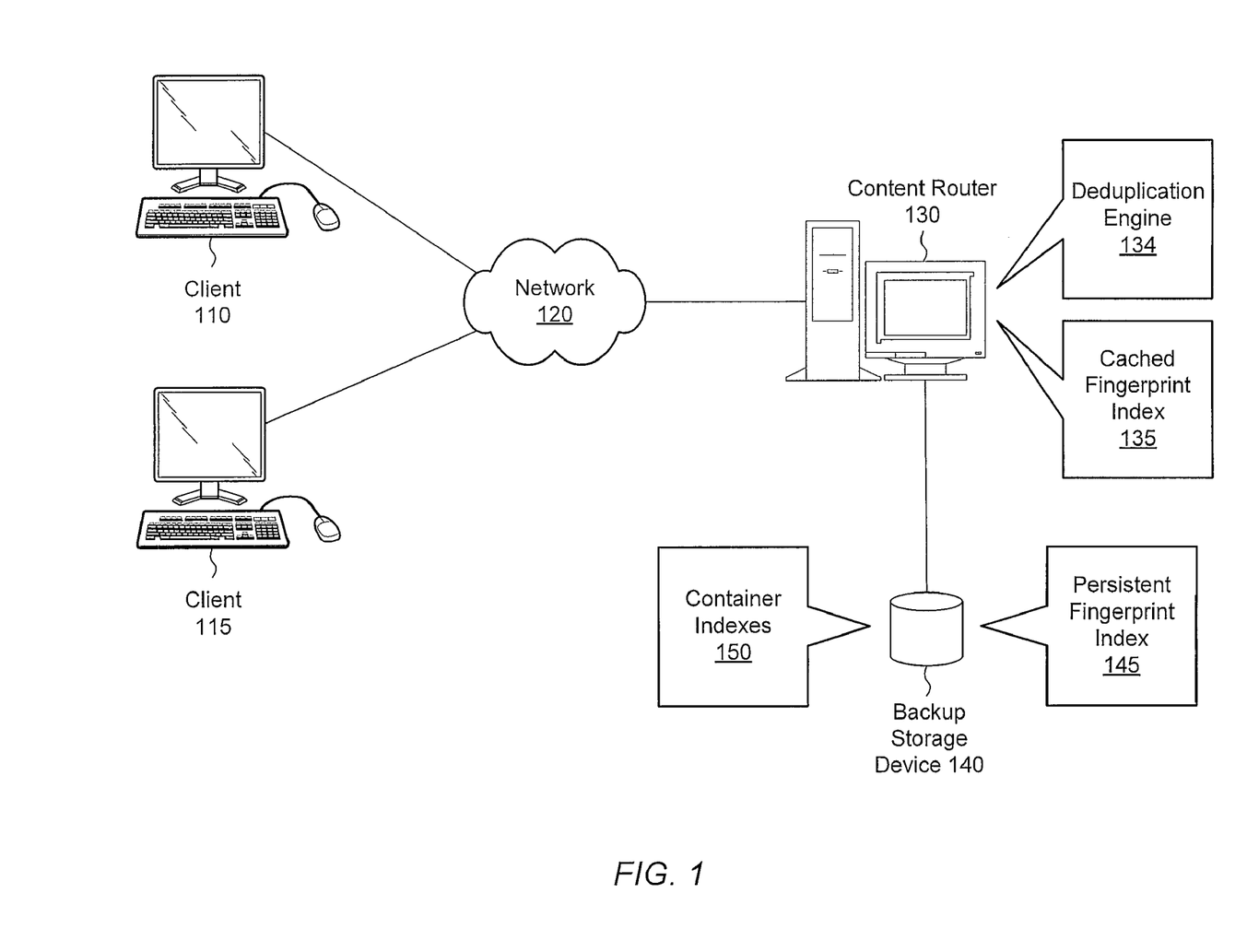
FIG. 1 is a diagram that illustrates a deduplication storage system architecture in accordance with one or more embodiments.

Referring to FIG. 1, a generalized block diagram of one embodiment of a deduplication storage system architecture is shown. Content router 130 and clients 110 and 115 are connected to network 120. Network 120 may comprise a variety of network connections including combinations of local area networks (LANs), such as Ethernet networks, Fiber Distributed Data Interface (FDDI) networks, token ring networks, and wireless local area networks (WLANs) based on the Institute of Electrical and Electronics Engineers (IEEE) 802.11 standards (Wi-Fi), and wide area networks (WANs), such as the Internet, cellular data networks, and other data communication networks. Other network connections and architectures are possible and contemplated.

Content router 130 may be the controller of a deduplication storage system. Content router 130 may manage backup storage device 140, and content router 130 may maintain metadata associated with backup data received from clients 110 and 115. Content router 130 is representative of any number of content routers, media servers, master servers, or other types of servers which may be connected to network 120. In other embodiments, content router 130 may be a media server, master server, other type of server, or some combination of one or more servers and content routers in a deduplication storage system.

Content router 130 may host software to perform tasks associated with backing up and restoring data to clients 110 and 115. Content router 130 may also host software to perform tasks associated with deduplicating data received from clients 110 and 115; this software may include deduplication engine 134. Content router 130 may perform deduplication using a variety of different techniques. For example, content router 130 may implement in-line deduplication for clients 110 and 115. Clients 110 and 115 may compute fingerprints for data segments and send the fingerprints to content router 130. Deduplication engine 134 running on content router 130 may compare each fingerprint to cached fingerprint index 135 and request the corresponding data segment from client 110 or 115 if no matching fingerprint is found in cached fingerprint index 135. Alternatively, content router 130 may receive data from clients 110 and 115, and then deduplication engine 134 may partition the data into segments and compute fingerprints from the segments. Other techniques of deduplication that may be implemented by content router 130 and deduplication engine 134 are possible and are contemplated.

As part of the deduplication process, fingerprints may be generated for data segments from clients 110 and 115. Any of a variety of methods or techniques (e.g., hash, MD-5, SHA-1) may be used to generate a fingerprint from a data segment. After generating a new fingerprint, content router 130 may search cached fingerprint index 135 for a matching fingerprint. Content router 130 may store cached fingerprint index 135, and cached fingerprint index 135 may be used to provide a mapping of fingerprints to data segments within containers of backup storage device 140. If a match is found, then the new data segment and fingerprint may be discarded and a reference to the identical data segment already in storage may be stored in its place and/or in a metadata store. If a match is not found after searching cached fingerprint index 135, then the new data segment may be stored in a container in backup storage device 140 and an entry with the new fingerprint may be added to cached fingerprint index 135. Data may be organized in containers within backup storage device 140. In some embodiments, multiple data segments may be stored together within a container. A container may be a logical entity associated with a variable-sized portion of a file system that includes a number of allocated units of data storage. Also, a container may be mapped to a physical location in backup storage device 140.

Content router 130 may be configured to store backup data in backup storage device 140. Content router 130 may be directly connected to backup storage device 140 or content router 130 may be connected to backup storage device 140 over any of a variety of networks, such as a LAN, storage area network (SAN), or other network. In one embodiment, backup storage device 140 may be an adapter card directly attached to a bus of content router 130. Content router 130 may use internal memory (e.g., random-access memory (RAM)) for buffering data when receiving and sending data to and from clients 110 and 115, backup storage device 140, or other devices. Backup storage device 140 is representative of any number of backup storage devices, and may comprise any of a variety of types of storage media, such as a hard disk drive, disk volume, optical drive, tape drive, tape volume, robotic tape library, or other storage medium.

Clients 110 and 115 may communicate with content router 130 to backup and restore data. The data may take the form of a data set, a group of files, an image, a snapshot, a group of directories, database, volume, file system, or other structure of data. Clients 110 and 115 are representative of any number of stationary or mobile computers such as servers, desktop PCs, laptops, handheld computers, smartphones, or other computing devices.

After a data set has been backed up, client 110 or client 115 may wish to restore one or more data items from the backed up data set. For example, client 110 may request one or more data items (e.g. files, emails, images) or an entire backup image from content router 130. In response, content router 130 may retrieve from the metadata a mapping of the data segments that correspond to the requested data items. The metadata may include a data segment to fingerprint mapping, or content router 130 may create a data segment to fingerprint mapping as needed. Content router 130 may use the mapping to identify a fingerprint associated with each data segment. Then, content router 130 may search cached fingerprint index 135 and/or persistent fingerprint index 145 to locate the fingerprint entry containing the identified fingerprint.

In one embodiment, the retrieved entry in cached fingerprint index 135 may include an identification (ID) of the container in which the requested data item is stored. Each container may also contain an index listing the segments stored within that container. Content router 130 may locate and retrieve the requested data item using the container ID and the container index, and then content router 130 may send the requested data item to client 110.

Cached fingerprint index 135 may be stored in an in-memory cache of content router 130. The size of cached fingerprint index 135 may fluctuate as entries are added and deleted. When it is no longer possible to add a new entry to cached fingerprint index 135 without exceeding the available capacity of the in-memory cache, cached fingerprint index 135 may enter a binary sampling mode. Operating in binary sampling mode may result in about 50% of the fingerprint entries being retained in the cache while the remaining fingerprint entries may be allowed to be replaced as needed.

In one embodiment, the entries may be separated into two groups based on the least significant bit (LSB) of the fingerprint. If the fingerprint LSB is 0, then the corresponding fingerprint entry may be categorized as a sample and retained. If the fingerprint LSB is 1, then the corresponding fingerprint entry may be categorized as a non-sample and discarded as needed. Alternatively, this classification decision may be reversed, such that if the fingerprint LSB is 1, then the entry may be a sample and if the fingerprint LSB is 0, then the entry may be a non-sample.

In other embodiments, other determining factors may be used to separate the fingerprint entries into the two groups. For example, a bit of the fingerprint other than the LSB may be used. Also, the decision to separate the entries into groups may be based on a checksum or hash value of the fingerprint. Other methods of separating the fingerprint entries into two or more groups are possible and are contemplated.

After switching to binary sampling mode, and effectively reducing the size of cached fingerprint index 135 in half, new fingerprint entries may continue to be added to cached fingerprint index 135. Non-sample entries may be discarded to make room for the new fingerprint entries. Eventually, the number of sample entries in cached fingerprint index 135 may again exceed the available capacity of the in-memory cache. When this happens, the binary sampling mode may be increased from level one to level two. In level two of binary sampling, the two LSB's of each fingerprint are read, and if the two LSB's are both 0, then the entry with that fingerprint may be categorized as a sample and retained. All other entries may be categorized as non-samples and replaced as needed. As the size of cached fingerprint index 135 increases, further levels of binary sampling may be employed, such that the three LSB's of the fingerprint may be read, then the four LSB's, and so on. Alternatively, if other methods of separating the fingerprint entries into two groups are utilized, then these other methods may be refined to further classify the fingerprint entries into finer levels of groups.

In most of the examples described herein, cached fingerprint index 135 is portrayed as increasing in size. However, in some embodiments, cached fingerprint index 135 may decrease in size as the number of data segments and fingerprints within the deduplication storage system are reduced. If cached fingerprint index 135 is utilizing a binary sampling mode, as the size of index 135 is reduced to less than half the size of the in-memory cache, cached fingerprint index 135 may switch to a lower level of binary sampling. If cached fingerprint index 135 is utilizing level one of binary sampling and the size of index 135 falls below a threshold, then cached fingerprint index 135 can switch out of binary sampling mode, and then all of the fingerprint entries may be retained by cached fingerprint index 135 and stored in the in-memory cache. Cached fingerprint index 135 may switch to a higher or lower level of binary sampling as circumstances dictate. It is noted that in various embodiments, switching to a lower level of sampling may require reloading samples for that level from the persistent index, container index, or otherwise.

A full fingerprint index may be stored as a persistent copy of the fingerprint index; this persistent copy of the fingerprint index (i.e., persistent fingerprint index 145) may be stored in a non-volatile storage device (i.e., backup storage device 140). When a new fingerprint is generated, cached fingerprint index 135 may be queried to see if it contains a matching fingerprint. Persistent fingerprint index 145 may not be searched during this query, since a search of persistent fingerprint index 145 may be much slower than a search of cached fingerprint index 135.

If the search determines a matching fingerprint does not exist in cached fingerprint index 135, then a new entry may be added to cached fingerprint index 135 for the new fingerprint, and the corresponding data segment may be stored in a container in backup storage device 140. An identification (ID) of the container may be stored in the new entry in cached fingerprint index 135.

This process of searching cached fingerprint index 135 and adding new entries to index 135 as needed will continue as described above until the size of index 135 exceeds the size of the cache memory. When the size of cached fingerprint index 135 exceeds the size of the cache memory, the content router may switch to binary sampling mode for index 135. In other embodiments, the trigger for switching to binary sampling mode may be when the size of cached fingerprint index 135 exceeds a predetermined percentage of the cache memory. For example, in one embodiment, the predetermined percentage may be 90%.

In binary sampling mode, if a fingerprint query results in finding a matching fingerprint in an entry in cached fingerprint index 135, the entry may be read to determine the ID of the container where the corresponding data segment is stored. After retrieving the container ID, container indexes 150 may be queried to find all non-sample entries with the same container ID. Each container stored in backup storage device 140 may have an index; these indexes may be collectively referred to as container indexes 150. Each container index may contain fingerprints of the data segments stored in the respective container. The container index for a specific container may be stored within the container.

The non-sample entries with the same container ID may be copied from the corresponding container index to cached fingerprint index 135. The non-sample entries may have a high probability of being accessed due to the spatial or temporal locality of containers and segments stored within containers. Non-sample entries currently in index 135 with different container ID's may be discarded to make room for the non-sample entries with the same ID as the retrieved container ID.

These non-sample entries with the same container ID as the just queried sample may be termed the "working set" entries. In some embodiments, working set entries may be protected such that the entries may not be discarded when new entries are added to the cached fingerprint index. The working set entries may be treated as if they were samples, even if they have been classified as non-samples or possess characteristics of non-samples. In other embodiments, content router 130 may designate a group of containers which have been frequently accessed during the most recent fingerprint index accesses as a working set of containers, and any non-sample entries from this working set of containers may also be labeled as working set entries.

While in binary sampling mode, if cached fingerprint index 135 is searched as part of a query for a new fingerprint, it may be determined that the new fingerprint does not have a match in index 135. In this case, a new entry may be added to the cached fingerprint index for the new fingerprint. The new segment, corresponding to the new fingerprint, may be stored in a container in backup storage device 140. There is the possibility that the new segment and new fingerprint are redundant. Only cached fingerprint index 135 has been searched, and cached fingerprint index 135 may be incomplete in binary sampling mode. It is possible the new fingerprint exists in persistent fingerprint index 145, and in that case, a new, redundant fingerprint entry may be added to the deduplication storage system. The likelihood of creating duplicate entries may increase as the binary sampling level is increased. However, a background queue processing application may be used to detect and delete duplicate entries. The background queue processing application may run periodically in the background to detect duplicate entries and remove them.

In some embodiments, transaction log entries may be added to cached fingerprint index 135. In one embodiment, there may be a flag in each entry which indicates whether or not the entry is a transaction log entry. The flag may also be referred to as a non-committed flag. In another embodiment, there may be a counter value that indicates if the entry is a transaction log entry. If the counter value is above a certain threshold, then the entry is a transaction log entry and if the counter value is below the threshold, then this indicates the entry has already been written to persistent fingerprint index 145. The transaction log entries may include any new entries corresponding to new fingerprints that have been added to the deduplication storage system. Eventually, the transaction log entries may be added to persistent fingerprint index 145, to ensure that persistent fingerprint index 145 contains entries for all of the fingerprints of the deduplication storage system.

The new entries may not be written to persistent fingerprint index 145 on a one-by-one basis, but instead, content router 130 may wait until the number of transaction log entries reaches a certain threshold before processing the transaction log entries and writing the entries to persistent fingerprint index 145. Alternatively, content router 130 may schedule a processing event on a periodic schedule, or content router 130 may schedule a processing event during off hours or when the network traffic is slow and content router 130 has available processing cycles to write the transaction log entries to persistent fingerprint index 145.

The content router may also maintain a transaction log stored in backup storage device 140, and the transaction log may store details of each of the transaction log entries in cached fingerprint index 135. The transaction log may preserve the data in the transaction log entries in case content router 130 or cached fingerprint index 135 loses power and the contents of index 135 are lost.

Content router 130 and clients 110 and 115 of FIG. 1 may comprise various hardware and software components. The hardware components may include one or more processors, memory devices, and input/output (I/O) devices, connected together via a bus architecture. The software components may include an operating system stored in a memory device. The operating system may be any of various types of operating systems, such as Microsoft Windows®, Linux®, Solaris®, or others. The operating system may be operable to provide various services to the user and may support the execution of various programs such as backup applications, server applications, deduplication engines, software agents, or any of a variety of other applications.

In other embodiments, the number and type of clients, content routers, networks, and backup storage devices is not limited to those shown in FIG. 1. Any number and combination of content routers, servers, desktops, laptops, and mobile clients may be interconnected in network architectures via various combinations of modem banks, direct LAN connections, wireless connections, WAN links, etc. Also, at various times one or more clients and servers may operate offline. In addition, during operation, individual client and server connection types may change as mobile users travel from place to place connecting, disconnecting, and reconnecting to network 120.

Figure 2:
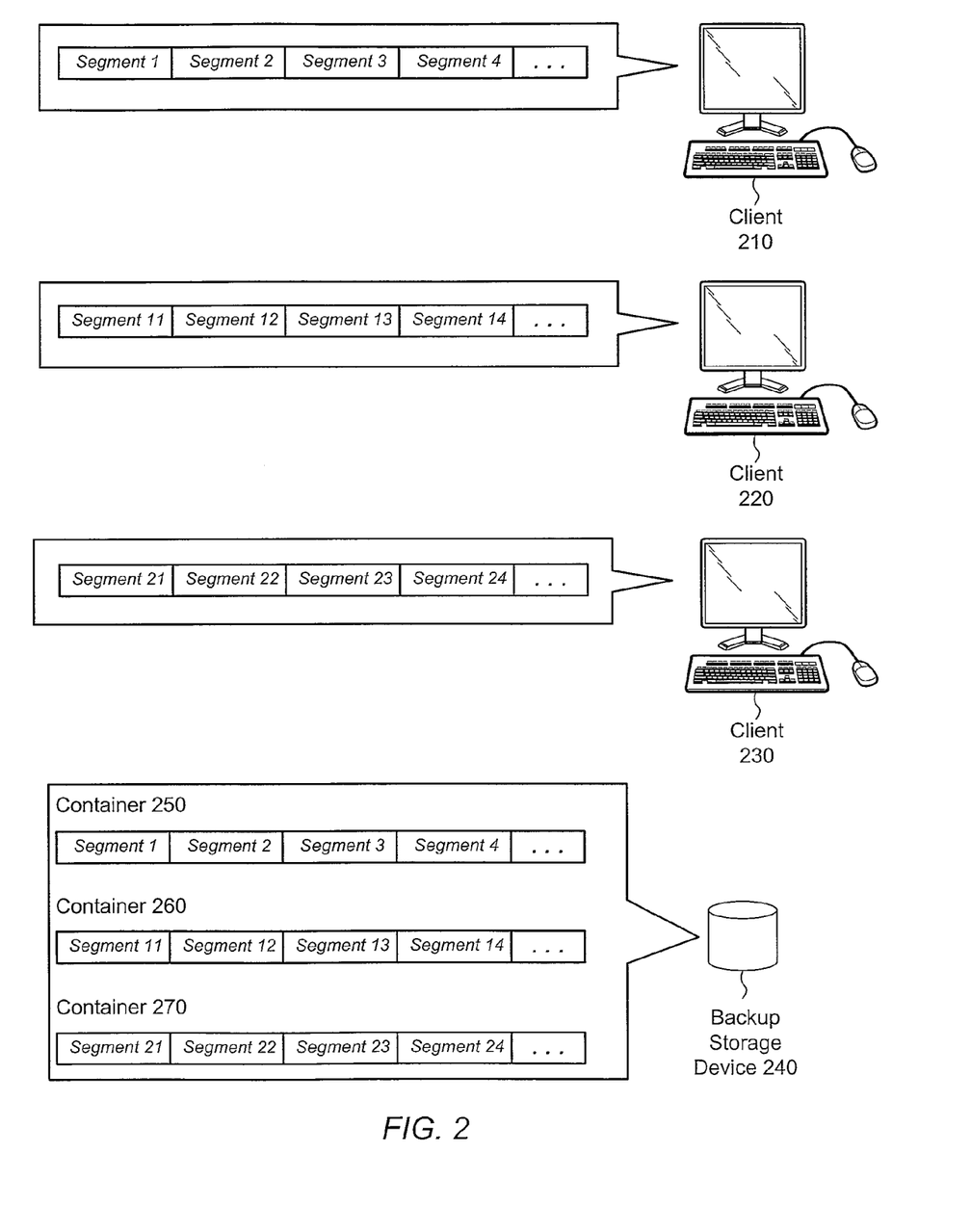
FIG. 2 illustrates the locality of data segment storage in containers within a backup storage device.

Referring now to FIG. 2, an illustration of the locality of data segment storage in containers within a backup storage device is shown. Client 210 stores data, including segments 1-4. Segments 1-4 may represent any number of data segments stored by client 210. Client 210 may backup this data to backup storage device 240. Client 210 may connect to backup storage device 240 over a network (not shown) via a content router (also not shown). Backup storage device 240 may store segments 1-4 in container 250. Additional segments from client 210 may be stored in container 250 until container 250 is full. When container 250 is full, another container may be created for client 210 and additional data segments from client 210 may be stored in this new container. This process may continue until all of the data from client 210 has been stored in backup storage device 240.

Client 220 stores data segments 11-14, and segments 11-14 may represent any number of data segments stored by client 220. Client 220 may send these data segments to backup storage device 240. Backup storage device 240 may store segments 11-14 in container 260. Client 230 stores data segments 21-24, and segments 21-24 may represent any number of data segments stored by client 230. Client 230 may send these data segments to backup storage device 240. Backup storage device 240 may store segments 21-24 in container 260. Backup storage device 240 may be receiving data from multiple clients simultaneously and still store data from separate clients in separate containers.

FIG. 2 illustrates the spatial locality which may exist within a deduplication storage system. Data segments from multiple clients are kept separate and stored in containers with other data segments from the same client. In this way, when a restore operation is requested, a client's data segments may be quickly recovered from a small number of containers. A client's data segments may be stored in a small number of containers instead of being interspersed across a wide number of containers with only one or two segments per container. The spatial locality may be utilized by the methods and mechanisms described herein to efficiently perform disk lookups and prefetch fingerprints from a persistent copy of a fingerprint index to the cached copy of the fingerprint index.

Figure 3:
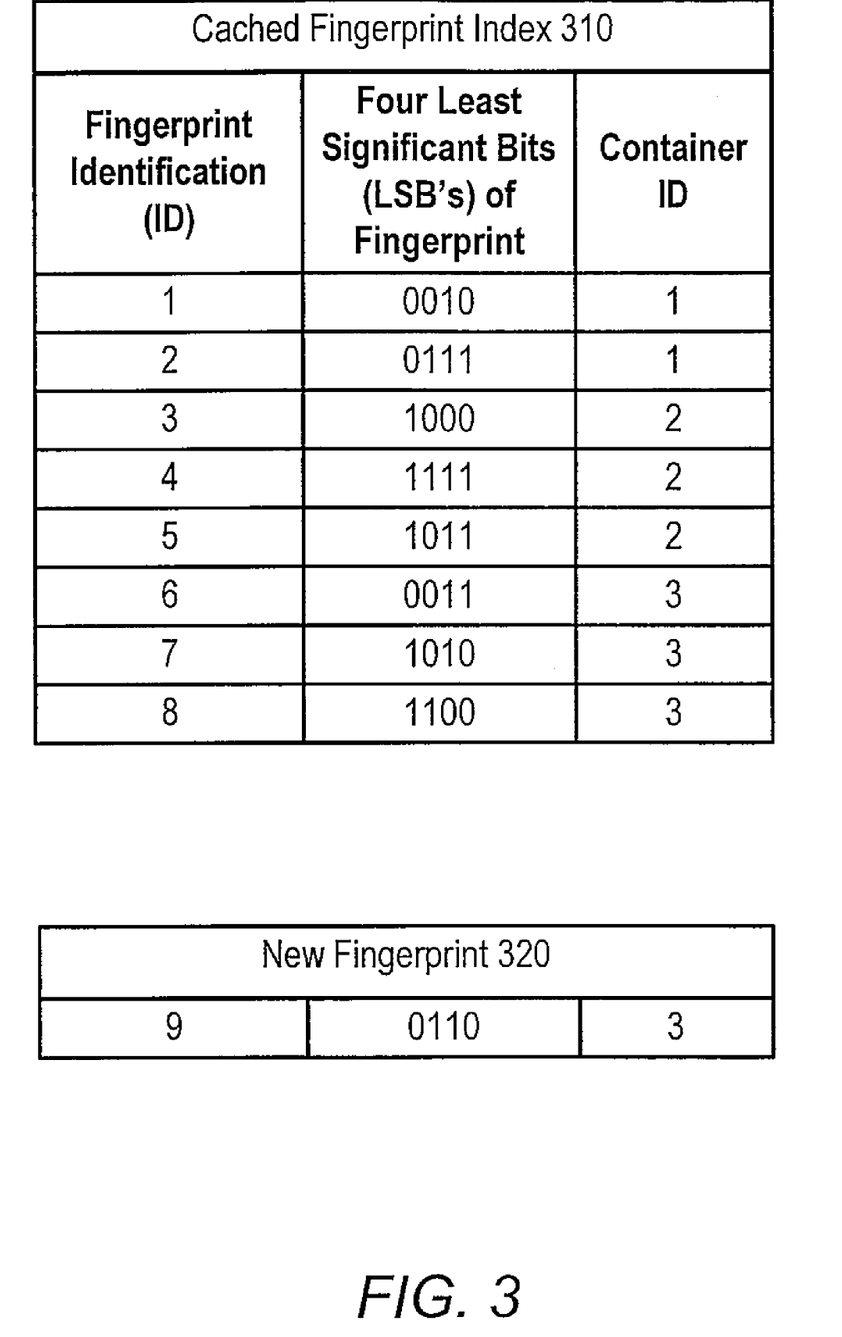
FIG. 3 illustrates a cached fingerprint index in accordance with one or more embodiments.

Referring now to FIG. 3, one embodiment of a cached fingerprint index is shown. Cached fingerprint index 310 contains eight entries for eight fingerprints with fingerprint identifications (ID's) 1-8. The four least significant bits (LSB's) of each fingerprint are shown in cached fingerprint index 310. The four LSB's are shown for illustrative purposes only, in an actual implementation of cached fingerprint index 310, each entry may contain the entire fingerprint, and the four LSB's may not be separated out into a separate column. The container ID's for each fingerprint are also listed in cached fingerprint index 310. The container ID indicates the container where the corresponding data segment is stored in a backup storage device.

In the example shown in FIG. 3, it will be assumed that the storage space available in a cache or other low latency storage device is limited to eight fingerprint entries. This is for illustrative purposes only; in actual implementations, the size of the cache or other low latency storage device may be able to store many more fingerprint entries. As shown in FIG. 3, cached fingerprint index has reached the limit of the available storage space in the cache. New fingerprint 320 is also shown in FIG. 3, and new fingerprint 320 has an ID of 9 and four LSB's of "0110". New fingerprint 320 also corresponds to a data segment that is stored in container ID 3. The data segment may have already been stored in container ID 3, and the next step in the deduplication process for the deduplication storage system may be to store new fingerprint 320 in cached fingerprint index 310. However, there is no additional storage capacity in the cache to store a new fingerprint entry in index 310.

Figure 4:
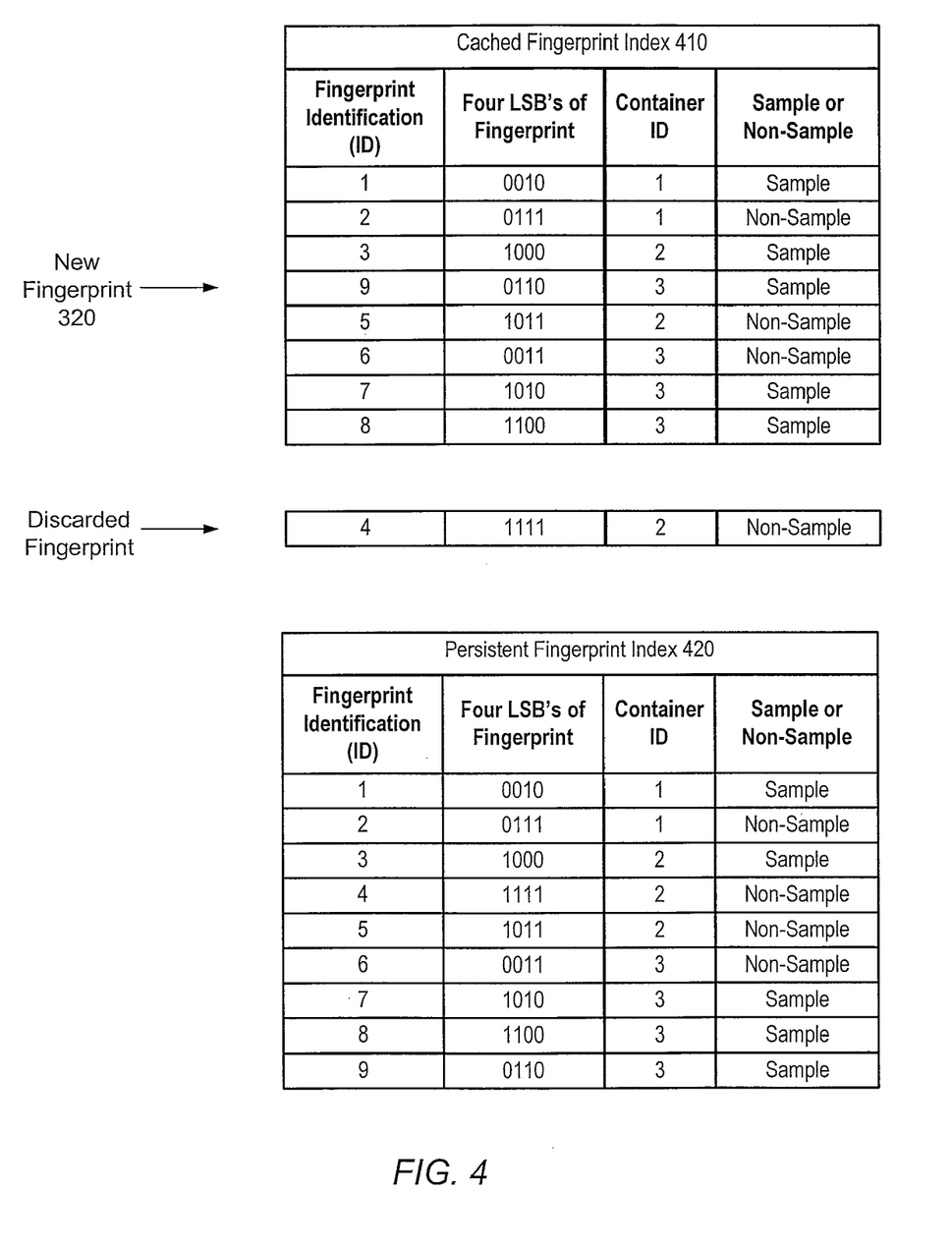
FIG. 4 illustrates a cached fingerprint index and persistent fingerprint index in accordance with one or more embodiments.

Referring now to FIG. 4, one embodiment of a method for adding a new fingerprint entry to a cached fingerprint index at full capacity is shown. When it is determined that the size of the cached fingerprint index has reached the limit of the storage device and a new entry needs to be added to the index, the deduplication storage system may enter binary sampling mode. Alternatively, if the deduplication storage system is already in binary sampling mode and the index is at full capacity, the deduplication storage system may switch to a higher level of binary sampling.

When the deduplication storage system enters binary sampling mode, fingerprint entries in cached fingerprint index 410 may be split into two groups: samples and non-samples. In one embodiment, entries containing a fingerprint with a LSB of 0 may be categorized as samples, and entries containing a fingerprint with a LSB of 1 may be categorized as non-samples. The sample entries may be retained in cached fingerprint index 410, and the non-sample entries may be discarded from index 410 as needed to make room for new fingerprint entries. The column shown in cached fingerprint index 410 to indicate whether an entry is a sample or non-sample is for illustrative purposes only. In some embodiments, index 410 may not contain a separate indicator or flag for each entry indicating whether the entry is a sample or a non-sample. The deduplication storage system may determine if the entry is a sample or a non-sample by reading the LSB of the fingerprint. In other embodiments, the index 410 may contain an indicator or flag for each entry to designate the entry as a sample or a non-sample.

In the example shown in FIG. 4, fingerprint ID 4, categorized as a non-sample, may be discarded from cached fingerprint index 410. Then, new fingerprint 320 (of FIG. 3) may be added to cached fingerprint index 410. Different determinations may be made as to which non-sample entry from cached fingerprint index 410 may be discarded to make room for a new fingerprint entry. In one embodiment, the least recently accessed non-sample entry may be discarded. There may be a time stamp associated with each entry to keep track of the last time the entry was accessed. In another embodiment, the non-sample entry that has been in cached fingerprint index 410 for the longest amount of time may be discarded. There may be a time stamp associated with each entry or container to keep track of when the entry was added to cached fingerprint index 410.

In a further embodiment, a non-sample entry may be discarded based on the amount of time that has elapsed since any entries associated with the same container ID as the non-sample entry have been accessed. In a still further embodiment, non-sample entries may be selected for removal on a random basis. In a still further embodiment, non-sample entries associated with a container ID different than the container ID of the new fingerprint entry may be chosen from when discarding non-sample entries. A combination of one or more of the above-described methods for choosing which non-sample entries to discard may be combined within a single embodiment. Other methods of deciding which non-sample entries to discard are possible and are contemplated.

As shown in FIG. 4, the fingerprint entry for fingerprint ID 4 is discarded. Alternatively, any of the other non-sample entries could have been discarded from index 410. The new fingerprint (ID 9) is associated with container ID 3, and so it is likely that other entries associated with container ID 3 may be accessed in subsequent fingerprint queries. Therefore, the fingerprint entry for fingerprint ID 6, though it is a non-sample, may be retained since it is also associated with container ID 3.

Persistent fingerprint index 420 is also shown in FIG. 4. Persistent fingerprint index 420 may be stored in a non-volatile storage device with a large storage capacity. Persistent fingerprint index 420 may maintain entries for all of the fingerprints in the deduplication storage system. As shown in FIG. 4, persistent fingerprint index 420 contains all of the entries of cached fingerprint index 410; index 420 also contains the entry associated with ID 4, which was discarded from index 410.

Figure 5:
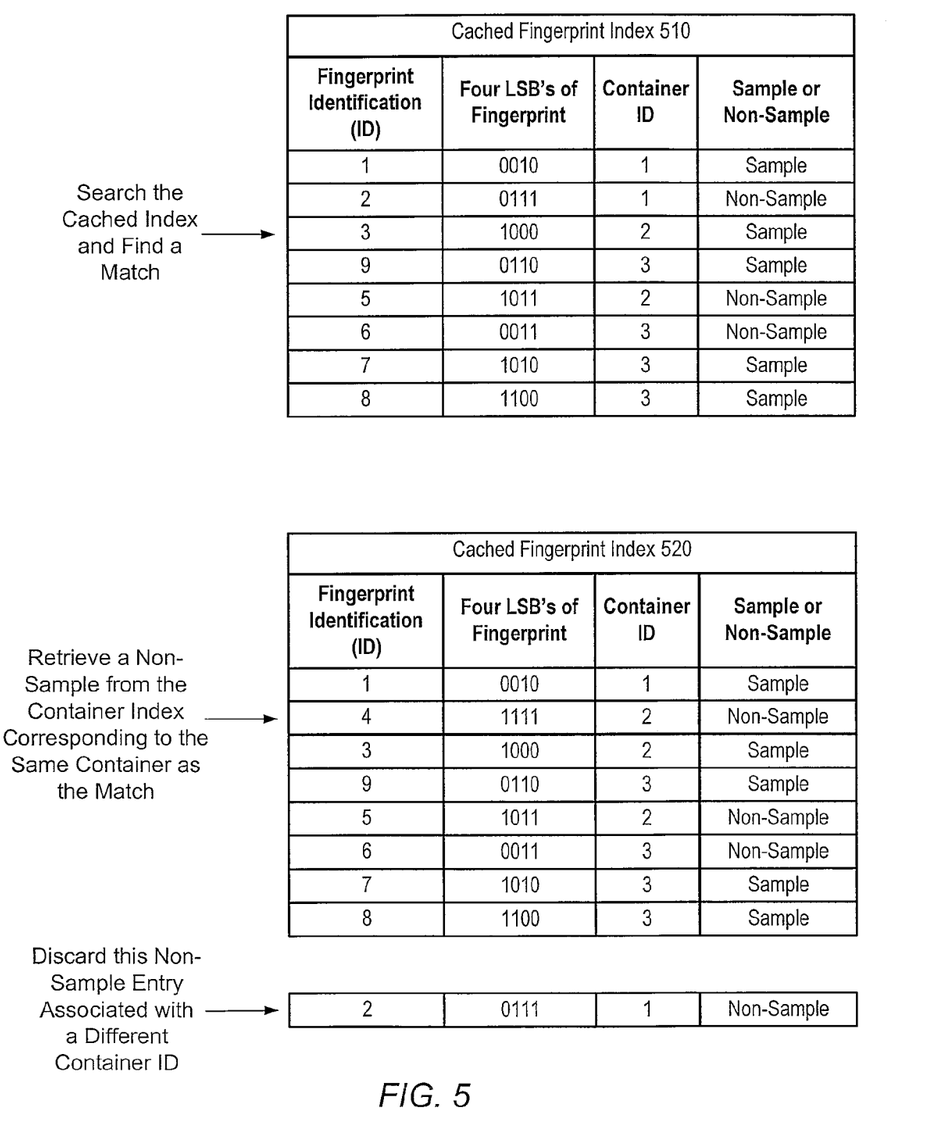
FIG. 5 illustrates one embodiment of a process for updating a cached fingerprint index.

Turning now to FIG. 5, one embodiment of a process for prefetching entries to a cached fingerprint index is shown. Cached fingerprint index 510 contains the same eight entries as cached fingerprint index 410 (of FIG. 4). In the example illustrated in FIG. 5, a search of cached fingerprint index 510 has just been performed for a new fingerprint (not shown), and a matching fingerprint has been found; the matching fingerprint is fingerprint ID 3. The new fingerprint and corresponding data segment may be discarded from the deduplication storage system, and the metadata may be updated to reference fingerprint ID 3 for the discarded data segment and fingerprint.

As shown in FIG. 5, cached fingerprint index 510 is in binary sampling mode. In response to the fingerprint query finding a matching fingerprint, and since the entry is a sample, non-sample entries with the same container ID may be prefetched from the container index. The container ID of the matching fingerprint is container ID 2. Persistent fingerprint index 420 may be searched for all non-sample entries with container ID 2, and then these entries may be copied to cached fingerprint index 510. In this case, only one non-sample entry, for fingerprint ID 4, is associated with container ID 2, and so this entry may be copied to cached fingerprint index 510. Only non-sample entries may need to be copied from persistent fingerprint index 420 because it may be assumed that all sample entries with container ID 2 are already in cached fingerprint index 510.

In the example shown in FIG. 5, cached fingerprint index 520 represents cached fingerprint index 510 after the entry for fingerprint ID 4 has been added to index 510. The entry for fingerprint ID 2 has been discarded from cached fingerprint index 520 to make room for the prefetched entry. The entry for fingerprint ID 2 has been discarded because it is a non-sample entry and is associated with a container different than container ID 2. As previously described, there are a variety of different methods that may be employed to decide which entry to discard.

Figure 6:
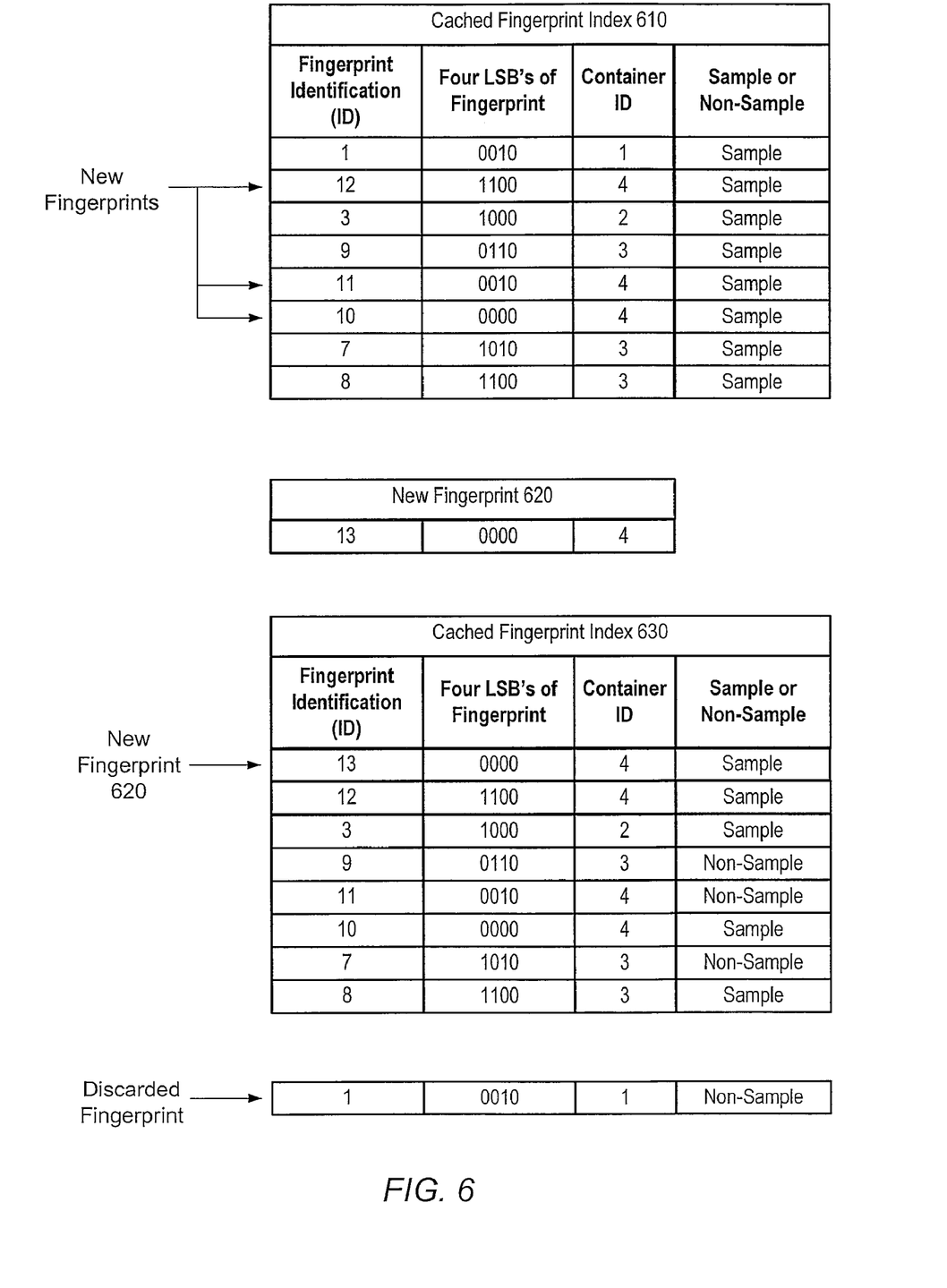
FIG. 6 illustrates one embodiment of a cached fingerprint index switching to level two of binary sampling.

Turning now to FIG. 6, one embodiment of a cached fingerprint index switching to the second level of binary sampling is shown. Cached fingerprint index 610 is shown, and cached fingerprint index 610 represents cached fingerprint index 510 (of FIG. 5) after three new entries for three new fingerprints have been added to index 510. As illustrated in cached fingerprint index 610, all of the entries are samples after the three new entries, corresponding to fingerprint ID's 10-12 have been added to index 610. Three non-sample entries have been discarded to make room for the new entries. For illustrative purposes only, it is assumed that the storage device storing cache fingerprint index 610 may be able to store a maximum of eight entries. In other embodiments, the number of entries that may be stored in a storage device may be much higher than eight. As shown in FIG. 6, cached fingerprint index 610 has reached the upper limit on the number of entries that may be stored in index 610.

Also shown in FIG. 6 is new fingerprint 620. New fingerprint 620 corresponds to a new data segment (not shown) that has been added to the deduplication storage system; the new data segment has been stored in container 4, as indicated in FIG. 6. Since cached fingerprint index 610 is not able to store a new entry for new fingerprint 620, and since the deduplication storage system is already using binary sampling at level one (i.e., determining which entries are samples based on one LSB of the fingerprints), the deduplication storage system may now switch to level two of binary sampling to create space for new fingerprint entry 620. Cached fingerprint index 630 represents cached fingerprint index 610 after the switch to level two of binary sampling and after new fingerprint 620 has been added to index 610. The non-sample entry associated with fingerprint ID 1 has been discarded from cached fingerprint index 630 to create space for new fingerprint 620.

Switching to level two of binary sampling involves reading the two LSB's of each fingerprint and categorizing entries into samples and non-samples based on the two LSB's. For example, if the two LSB's of a fingerprint in cached fingerprint index 610 are both "0", then the entry with the fingerprint may be categorized as a sample. Otherwise, the entry may be categorized as a non-sample. Each higher level of binary sampling involves looking at more of the LSB's of the fingerprints to determine how to categorize the corresponding entry. For example, level three of binary sampling involves reading the three LSB's of fingerprints, level four involves reading the four LSB's of fingerprints, and so on. The deduplication storage system may switch to a higher level of binary sampling whenever the cached fingerprint index reaches the capacity of the storage device used to store the index.

Figure 7:
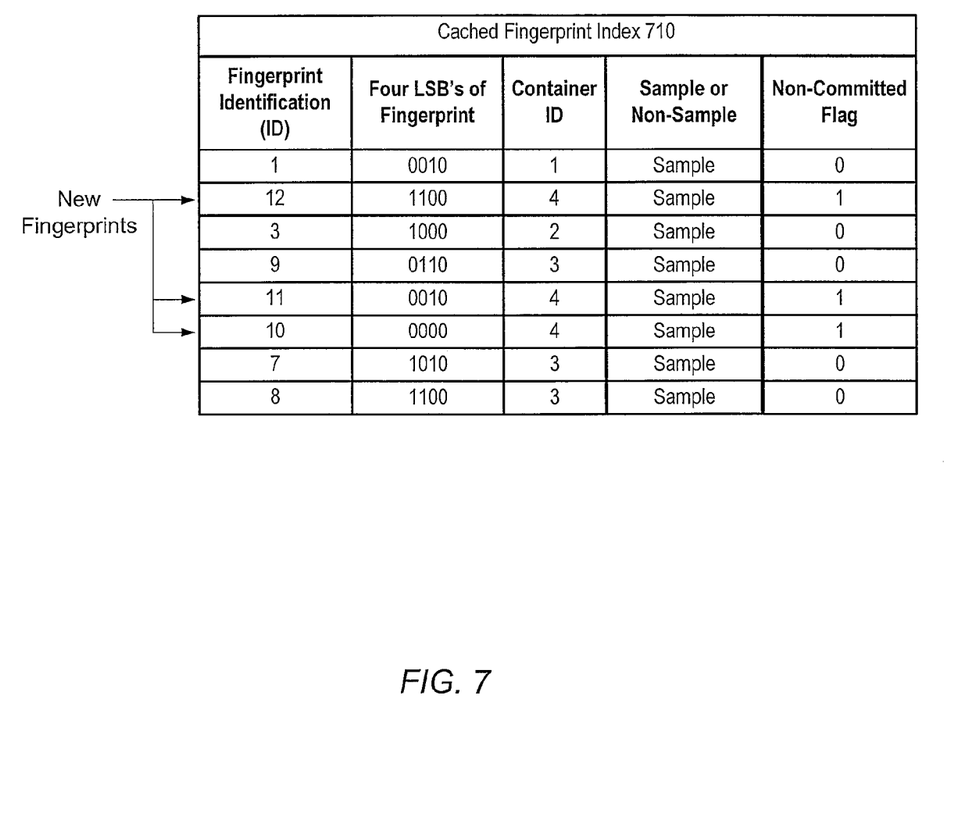
FIG. 7 illustrates one embodiment of a cached fingerprint index with a non-committed flag.

Turning now to FIG. 7, one embodiment of a cached fingerprint index storing new fingerprints as non-committed entries is shown. Cached fingerprint index 710 contains the same entries as cached fingerprint index 610 (of FIG. 6). New entries have been added to cached fingerprint index for fingerprint ID's 10-12, and these new entries each have a non-committed flag set to indicate they are new and that these entries have not yet been copied to the persistent fingerprint index. After the new entries have been copied to the persistent fingerprint index, then the non-committed flag may be cleared.

When new entries are added to cached fingerprint index 710, information about the entries may be written to a transaction log stored in a non-volatile storage device. The new entries may be referred to as transaction log entries while they are non-committed. The non-committed entries may be protected from being discarded when cached fingerprint index 710 needs to discard entries to make space for new entries or for prefetched non-sample entries from the persistent fingerprint index.

The deduplication storage system may wait until the number of new, non-committed entries reaches a predetermined threshold before copying the new entries from the cached fingerprint index to the persistent fingerprint index. Writes to the second fingerprint index may be much slower than writes to the cached fingerprint index, and it may be more efficient to write a group of entries to the persistent fingerprint index in one batch write operation than writing new entries one at a time to the second fingerprint index. In another embodiment, the deduplication storage system may copy uncommitted entries to the persistent fingerprint index on a periodic basis, regardless of the number of non-committed entries that have accumulated. The deduplication storage system may also copy non-committed entries to the persistent fingerprint index when processing cycles become available, when the network traffic is reduced, or when backup and restore operations are at a minimum.

When the deduplication storage system copies non-committed entries to the persistent fingerprint index, it may delete any duplicate entries that may exist. It is possible that duplicate entries have been added to the cached fingerprint index while in binary sampling mode. The deduplication storage system may check for the existence of non-committed entries in the persistent fingerprint index before it copies the non-committed entries to the persistent fingerprint index from the cached fingerprint index. If the deduplication storage system finds a duplicate entry among the non-committed entries, the system may discard the duplicate entry instead of copying it to the persistent fingerprint index and then the system may perform one or more clean up operations. These one or more clean up operations may include discarding the data segment corresponding to the duplicate fingerprint entry and freeing up the storage space utilized by the data segment. The clean up operations may also include updating the metadata to reference the matching fingerprint for the discarded, duplicate fingerprint and data segment.

Figure 8:
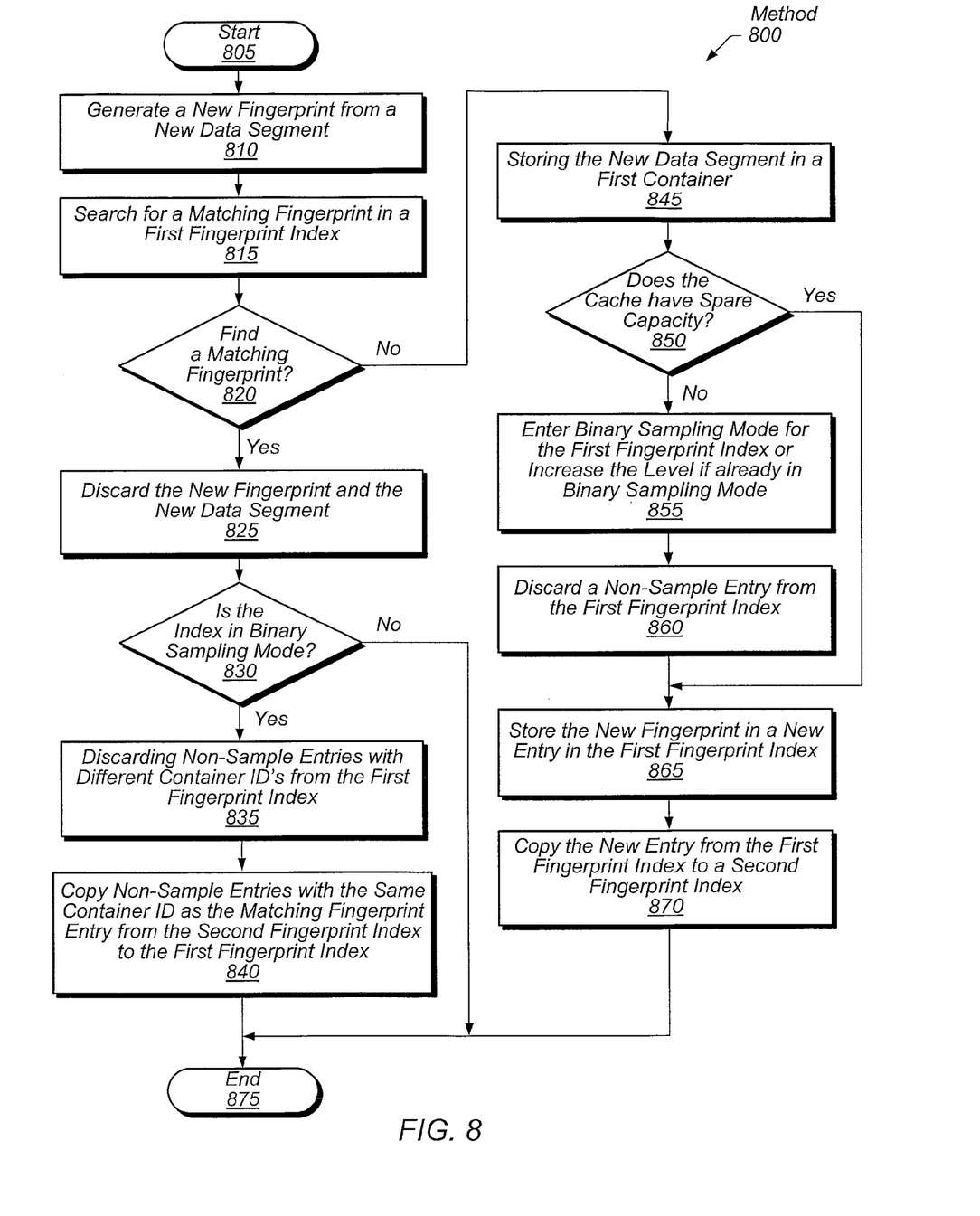
FIG. 8 is a generalized flow diagram illustrating one embodiment of a fingerprint index scaling method.

Referring now to FIG. 8, one embodiment of a method for scaling a fingerprint index is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

The method 800 starts in block 805, and then a new fingerprint is generated for a new data segment in block 810. The new fingerprint may be generated by a client and sent to a deduplication storage system, or the new fingerprint may be generated by the deduplication storage system. Next, a first fingerprint index may be searched for a matching fingerprint to the new fingerprint in block 815. The first fingerprint index may be stored in a cache or other low-latency storage device.

If a matching fingerprint is found (conditional block 820), then the new fingerprint and new data segment may be discarded (block 825). A metadata store may be updated as well to store a reference to the matching fingerprint in place of the discarded fingerprint.

If a matching fingerprint is not found (conditional block 820), then the new data segment may be stored in a first container (block 845). Then it may be determined if the cache has spare capacity for a new fingerprint entry. If the cache has spare capacity (conditional block 850), then the new fingerprint may be stored in a new entry in the first fingerprint index (block 865). If the cache does not have spare capacity (conditional block 850), then the first fingerprint index may enter binary sampling mode or the level of binary sampling may be increased if the first fingerprint index is already in binary sampling mode (block 855). Entering binary sampling mode may involve categorizing a first group of entries as samples and a second group of entries as non-samples. The entries may be categorized by reading the LSB of the fingerprint; if the LSB of the fingerprint is 0, then the entry may be a sample, and if the LSB of the fingerprint is 1, then the entry may be a non-sample. To increase the level of binary sampling may involve reading more than one LSB to categorize the entries into samples and non-samples. If the Nth level of binary sampling is used, then the N LSB's may be read to categorize the entries. For example, to use level 8 of binary sampling, the 8 LSB's may be read, and if all 8 LSB's of a fingerprint are 0's, then the corresponding entry may categorized as a sample. Otherwise, the entry may be categorized as a non-sample.

After block 855, a non-sample entry may be discarded from the first fingerprint index (block 860). The non-sample entry may be discarded to make room for a new entry in the first fingerprint index. Next, the new fingerprint may be stored in a new entry in the first fingerprint index (block 865). Then, the new entry may be copied from the first fingerprint index to a second fingerprint index stored on a second storage device (block 870). The second storage device may be a larger storage device than the cache and it may also have a higher latency than the cache. The new entry may be copied at a much later time to the second fingerprint index, and the new entry may be copied to the second fingerprint index in a batch write operation with other new entries. After block 870, method 800 may end in block 875.

After block 825, it may be determined if the first fingerprint index is in binary sampling mode (conditional block 830). The deduplication storage system may store a flag or other data to indicate the first fingerprint index is in binary sampling mode. If the index is in binary sampling mode (conditional block 830), then the non-sample entries with different container ID's than the container ID of the matching fingerprint may be discarded from the first fingerprint index (block 835). For each non-sample entry that is added to the first fingerprint index in block 840, a non-sample entry may be discarded (block 835). If the index is not in binary sampling mode (conditional block 830), then method 800 may end in block 875. After block 835, the non-sample entries with the same container ID as the matching fingerprint entry may be copied from the container index to the first fingerprint index (block 840). In various embodiments, non-sample entries will only be copied to the first fingerprint index if the matching fingerprint found in step 820 was a sample. After block 840, method 800 may end in block 875. In addition, in various embodiments, step 835 may first be attempted in order to accommodate the new entries copied in step 840. If step 835 is unsuccessful, then the sampling mode level may be increased (block 855).

It is noted that the above-described embodiments may comprise software. In such an embodiment, program instructions and/or a database (both of which may be referred to as "instructions") that represent the described systems and/or methods may be stored on a computer readable storage medium. Generally speaking, a computer readable storage medium may include any storage media accessible by a computer during use to provide instructions and/or data to the computer. For example, a computer readable storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g., synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM)), ROM, non-volatile memory (e.g. Flash memory) accessible via a peripheral interface such as the USB interface, etc. Storage media may include micro-electro-mechanical systems (MEMS), as well as storage media accessible via a communication medium such as a network and/or a wireless link.

In various embodiments, one or more portions of the methods and mechanisms described herein may form part of a cloud computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Although several embodiments of approaches have been shown and described, it will be apparent to those of ordinary skill in the art that a number of changes, modifications, or alterations to the approaches as described may be made. Changes, modifications, and alterations should therefore be seen as within the scope of the methods and mechanisms described herein. It should also be emphasized that the above-described embodiments are only non-limiting examples of implementations.

What is claimed is:

1. A method for use in a deduplication storage system, the method comprising:

generating a new fingerprint corresponding to a received data segment; and searching for a matching fingerprint to the new fingerprint in a first index;

in response to determining the first index does not include a match for the new fingerprint:

storing the new data segment in a first container of a first storage device; and entering a binary sampling mode for the first index in response to determining the first storage device has less than a given capacity, said binary sampling mode being configured to reduce a number of entries in the first index which are currently categorized as samples by re-categorizing as non-samples one or more existing entries in the first index which are currently categorized as samples;

wherein the binary sampling mode comprises:
categorizing a first subset of a plurality of entries of the first index as samples;
categorizing a second subset of the plurality of entries of the first index as non-samples;
wherein entries categorized as samples are not eligible for replacement in the first index, and entries categorized as non-samples are eligible for replacement in the first index.

2. The method as recited in claim 1, further comprising creating a new entry in the first fingerprint index for the new fingerprint; and storing a copy of the new entry in a second index in a second storage device.

3. The method as recited in 1, wherein in response to determining the first index includes a matching fingerprint for the new fingerprint and determining the first index is in a binary sampling mode, the method comprises:
identifying a container ID that corresponds to the matching fingerprint in the first index;
discarding the new fingerprint and the new data segment;
copying to the first index non-sample entries that contain a same container ID as the container ID of the matching fingerprint; and
for each non-sample entry copied from the second fingerprint index to the first fingerprint index, replacing an existing non-sample entry in the first index.

4. The method as recited in claim 1, wherein entries are categorized as samples if a least significant bit (LSB) of a corresponding fingerprint is 0, and wherein entries are categorized as non-samples if a LSB of a corresponding fingerprint is 1, samples representing entries which may not be replaced, and non-samples representing entries which may be replaced.

5. The method as recited in claim 2, further comprising increasing a level of binary sampling by categorizing entries as samples if an entry has a corresponding fingerprint with N LSB's set to 0, wherein N is a level of binary sampling, and categorizing all other entries as non-samples.

6. The method as recited in claim 1, further comprising:
marking the new entry as non-committed when the new entry is stored in the first fingerprint index; and
accumulating a plurality of new entries in the first index prior to copying plurality of new entries from the first index to the second index.

7. The method as recited in claim 6, wherein non-committed entries in the first index are not eligible for replacement while the first fingerprint index is in binary sampling mode.

8. The method as recited in claim 6, wherein the plurality of new entries in the first index are accumulated until a threshold number of new entries is reached.

9. The method as recited in claim 1, wherein the first storage device is a relatively low-latency storage device, and wherein the second storage device is a relatively high latency storage device with a capacity greater than that of the first storage device.

10. A non-transitory computer readable storage medium comprising program instructions to optimize the efficiency of a deduplication storage system, wherein when executed the program instructions are operable to:
generate a new fingerprint corresponding to a received data segment; and
search for a matching fingerprint to the new fingerprint in a first index;
in response to determining the first index does not include a match for the new fingerprint:
store the new data segment in a first container of a first storage device;
enter a binary sampling mode for the first index in response to determining the first storage device has less than a given capacity, said binary sampling mode being configured to reduce a number of entries in the first index which are currently categorized as samples by re-categorizing as non-samples one or more existing entries in the first index which are currently categorized as samples;
wherein in the binary sampling mode instructions are executable to:
categorize a first subset of a plurality of entries of the first index as samples;
categorize a second subset of the plurality of entries of the first index as non-samples;
wherein entries categorized as samples are not eligible for replacement in the first index, and entries categorized as non-samples are eligible for replacement in the first index.

11. The computer readable storage medium as recited in claim 10, wherein the instructions are further executable to create a new entry in the first fingerprint index for the new fingerprint; and store a copy of the new entry in a second index in a second storage device.

12. The computer readable storage medium as recited in claim 10, wherein entries are categorized as samples if a least significant bit (LSB) of a corresponding fingerprint is 0, and wherein entries are categorized as non-samples if a LSB of a corresponding fingerprint is 1, samples representing entries which may not be replaced, and non-samples representing entries which may be replaced.

13. The computer readable storage medium as recited in claim 10, wherein when executed the program instructions are further operable to:
mark the new entry as non-committed when the new entry is stored in the first fingerprint index; and
accumulate a plurality of new entries in the first index prior to copying plurality of new entries from the first index to the second index.

14. The computer readable storage medium as recited in claim 13, wherein non-committed entries in the first index are not eligible for replacement while the first fingerprint index is in binary sampling mode.

15. The computer readable storage medium as recited in claim 14, wherein the plurality of new entries in the first index are accumulated until a threshold number of new entries is reached.

16. The computer readable storage medium as recited in claim 10, wherein the first storage device is a relatively low-latency storage device, and wherein the second storage device is a relatively high latency storage device with a capacity greater than that of the first storage device.

17. A system for optimizing the efficiency of a deduplication storage system, the system comprising:
a server; and
two or more storage devices coupled to the server;
wherein the server is configured to:
store the new data segment in a first container of a first storage device;
enter a binary sampling mode for the first index in response to determining the first storage device has less than a given capacity, said binary sampling mode being configured to reduce a number of entries in the first index which are currently categorized as samples by re-categorizing as non-samples one or more existing entries in the first index which are currently categorized as samples;

wherein in the binary sampling mode instructions are executable to:

categorize a first subset of a plurality of entries of the first index as samples;

categorize a second subset of the plurality of entries of the first index as non-samples;

wherein entries categorized as samples are not eligible for replacement in the first index, and entries categorized as non-samples are eligible for replacement in the first index.

18. The system as recited in claim 17, wherein the server is further configured to create a new entry in the first fingerprint index for the new fingerprint; and store a copy of the new entry in a second index in a second storage device.

19. The system as recited in claim 17, wherein entries are categorized as samples if a least significant bit (LSB) of a corresponding fingerprint is 0, and wherein entries are categorized as non-samples if a LSB of a corresponding fingerprint is 1, samples representing entries which may not be replaced, and non-samples representing entries which may be replaced.

20. The system as recited in claim 18, wherein the server is further configured to increase a level of binary sampling, wherein increasing a level of binary sampling comprises categorizing entries as samples if an entry has a corresponding fingerprint with N LSB's set to 0, wherein N is a level of binary sampling, and categorizing all other entries as non-samples.

* * * * *